Patented Dec. 3, 1946

2,412,012

UNITED STATES PATENT OFFICE 2,412,012

PREPARATION OF ALDEHYDES AND ACETALS

Louis Schmerling and Vladimir N. Ipatieff, Riverside, Ill., assignors to Universal Oil Products Company, Chicago, Ill., a corporation of Delaware No Drawing. Application March 27, 1944,
Serial No. 528,346

6 Claims. (Cl. 260—601)

This invention relates to the reaction of an alcohol and a compound having the general formula:

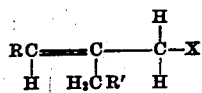

in which R and R' are selected from the group consisting of hydrogen and alkyl radicals and X is a halogen.

More specifically, the invention is directed to the manufacture of aldehydes and acetals by reacting an alcohol and a compound having the formula hereinbefore set forth. Not only is the reaction of our invention novel, but many of the materials which comprise the principal products of the reaction are new and hitherto undescribed compositions.

Our invention is distinguished by the fact that we obtain an unexpected result from the reaction of an alcohol and a compound corresponding to the general formula stated. We have found that the principal products of reaction of our invention comprise an aldehyde and an acetal rather than an alkyl allyl ether as is the case when allyl chloride is reacted with an alcohol.

In one specific embodiment, the present invention comprises the interaction of methanol with methallyl chloride, resulting in the formation of isobutyraldehyde-dimethylacetal and isobutyraldehyde as principal products of reaction.

As a further embodiment, this invention comprises the manufacture of new compositions of matter by the interaction of certain primary alcohols with a β-alkylallyl-halide.

By carrying out the reaction of our invention, new and useful products comprising various aldehydes and acetals may be prepared. These compounds are not only valuable in themselves but are also suitable for use as intermediate materials in the manufacture of useful products. For example, the products of our invention may be utilized as solvents and reagents and as intermediates in the formation of various resins, plastics, synthetic coatings, etc.

In general, primary alcohols such as methanol, ethanol, propanol, etc., are preferred for the present reaction although secondary and tertiary alcohols may also be used, though not necessarily with equivalent results. Materials suitable for reaction with the alcohol and which conform to the type formula hereinbefore set forth include methallyl chloride, methallyl bromide (1-halo-2-methylpropene-2); dimethylallyl halides (1-halo-2,3-dimethylpropene-2); methylethylallyl halides (1-halo-2-ethyl-3-methylpropene-2 and 1-halo-2-methyl-3-ethylpropene-2). The fluorides and iodides may also be used, but are not generally as readily available as the chlorides and bromides.

The proposed treatment of an alcohol with a compound such as methallyl chloride may be effectively carried out in the absence of any catalyst or special reaction medium. If desired, an aqueous or anhydrous alkali such as the hydroxide of sodium, potassium or magnesium may be added. In some instances it may be desirable to add a minor amount of a catalyst such as a metal halide, for example zinc chloride.

In general, reaction temperatures range between about 100° and about 250° C., although the specific temperature selected varies somewhat with the compounds undergoing conversion. In carrying out the reaction, an excess of alcohol is employed.

The examples which follow are introduced to illustrate our invention but are not to be considered as limiting the broad scope of the invention.

Example I

A solution of 25 grams of methallyl chloride in 40 grams of methanol was heated at 200° C. in a sealed tube for 4 hours. The tube was then cooled to —78° C. and opened. The liquid product was stabilized directly from the tube, washed with water to remove unreacted methanol, dried and distilled. There was obtained 10 grams of material boiling at 103–104° C. which consisted of isobutyraldehyde-dimethylacetal (i. e. 1,1-dimethoxy-2-methylpropane) which is a new composition of matter. In addition there was obtained 18.5 grams of condensible gas which consisted of a mixture of methyl chloride and methyl ether.

The above experiment was repeated on a somewhat larger scale using 75 grams each of methallyl chloride and methanol and a lower temperature, namely, 180° C. In this case, there was obtained 45.5 grams of condensible gas, 10 grams of isobutyraldehyde and 25 grams of isobutyraldehyde-dimethylacetal.

When the isobutyraldehyde-dimethylacetal was heated with an alcoholic solution of 2,4-dinitrophenylhydrazine in the presence of a drop of hydrochloric acid, there was obtained the 2,4-dinitrophenylhydrazone of isobutyraldehyde which had a melting point of 182° C.

Example II 50 grams of methallyl chloride was interacted with 75 grams of ethanol at a temperature of 180° C. The reaction products comprised 13 grams of isobutyraldehyde-diethylacetal which boiled at 132 to 133° C. and in addition 23 grams of ethyl chloride, 6 grams of ethyl ether and a small amount of isobutyraldehyde.

Example III

In a similar procedure to that followed in Examples I and II, 40 grams of methallyl chloride was reacted with 75 grams of n-propyl alcohol. The principal product of the reaction was isobutyraldehyde-di-n-propylacetal along with a minor amount of n-propyl chloride. The isobutyraldehye-di-n-propylacetal is also a new composition of matter.

We claim as our invention:

1. A process which comprises reacting an alcohol and a compound having the general formula:

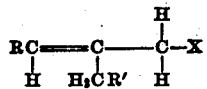

where R and R' are selected from the group consisting of hydrogen and alkyl radicals and X is a halogen, said reaction being effected at a temperature between about 100° C. and about 250° C.

2. A process which comprises reacting a primary alcohol with a compound having the general formula:

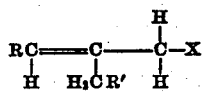

where R and R' are selected from the group consisting of hydrogen and alkyl radicals and X is a halogen, said reaction being effected at a temperature between about 100° C. and about 250° C.

3. A process which comprises reacting methanol with methallyl chloride to form isobutyraldehyde and isobutyraldehyde-dimethylacetal.

4. A process which comprises reacting ethanol with methallyl chloride to form isobutyraldehyde-diethylacetal and isobutyraldehyde.

5. A process which comprises reacting n-propyl alcohol with methallyl chloride to form isobutyraldehyde-di-n-propylacetal as a principal product of reaction.

6. A process for producing an aldehyde and an acetal which comprises reacting an alcohol and a compound having the general formula:

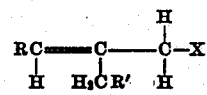

where R and R' are selected from the group consisting of hydrogen and alkyl radicals and X is a halogen, said reaction being effected at a temperature between about 100° C. and about 250° C.

LOUIS SCHMERLING.
VLADIMIR N. IPATIEFF.